(12) United States Patent
Chiang et al.

(10) Patent No.: US 8,635,615 B2
(45) Date of Patent: Jan. 21, 2014

(54) APPARATUS AND METHOD FOR MANAGING HYPERCALLS IN A HYPERVISOR AND THE HYPERVISOR THEREOF

(75) Inventors: Jui-Hao Chiang, Hsinchu (TW); Ying-Shiuan Pan, Kaohsiung (TW); Han-Lin Li, Taoyuan (TW); Po-Jui Tsao, Taiepi (TW)

(73) Assignee: Industrial Technology Research Institute, Hsinchu (TW)

( * ) Notice: Subject to any disclaimer, the term of this patent is extended or adjusted under 35 U.S.C. 154(b) by 365 days.

(21) Appl. No.: 13/226,900

(22) Filed: Sep. 7, 2011

(65) Prior Publication Data

US 2012/0291027 A1    Nov. 15, 2012

Related U.S. Application Data

(60) Provisional application No. 61/486,255, filed on May 14, 2011.

(51) Int. Cl.
*G06F 9/455* (2006.01)
*G06F 9/46* (2006.01)

(52) U.S. Cl.
USPC ................ 718/1; 718/102; 718/104; 718/108

(58) Field of Classification Search
USPC ...................................... 718/1, 102, 104, 108
See application file for complete search history.

(56) References Cited

U.S. PATENT DOCUMENTS

| 7,434,003 | B2 | 10/2008 | Oney et al. |
| 7,765,374 | B2 | 7/2010 | Field et al. |
| 7,975,908 | B1 | 7/2011 | Greco et al. |
| 8,191,064 | B2 * | 5/2012 | Song ................................ 718/1 |

(Continued)

FOREIGN PATENT DOCUMENTS

CN            101968749 A      2/2011

OTHER PUBLICATIONS

Barham et al. "Xen—The Art of Virtualization" SE computational Systems, SS 2004, University of Salzburg, pp. 1-15.*

(Continued)

*Primary Examiner* — Diem K Cao
*Assistant Examiner* — Willy W Huaracha
(74) *Attorney, Agent, or Firm* — Rabin & Berdo, P.C.

(57) ABSTRACT

In one embodiment, an apparatus for managing hypercalls in a hypervisor having an interrupt handler and a schedule is described. A deferrable low-overhead hypercall (DLH) module is configured to assign a separate DLH queue to each of a plurality of virtual machines when the virtual machine is initialized. Each entry in the separate DLH queue represents a hypercall routine. When one of the virtual machines notifies the interrupt handler of at least a deferrable hypercalls to be executed, the scheduler selects at least a virtual CPU (VCPU) and assigns them to the virtual machine to run on at least a physical CPU (PCPU). The DLH module executes the at least a deferrable hypercall inserted in a DLH queue assigned to the virtual machine before restoring the VCPU context to the virtual machine having the at least an assigned VCPU.

25 Claims, 9 Drawing Sheets

(56) References Cited

U.S. PATENT DOCUMENTS

| | | | |
|---|---|---|---|
| 8,417,862 B2* | 4/2013 | Talamacki et al. | 710/263 |
| 8,453,143 B2* | 5/2013 | Mahalingam et al. | 718/1 |
| 8,539,499 B1* | 9/2013 | Tovpeko et al. | 718/104 |
| 2009/0031304 A1* | 1/2009 | Song | 718/1 |
| 2009/0037941 A1* | 2/2009 | Armstrong et al. | 719/328 |
| 2009/0260008 A1 | 10/2009 | Cho et al. | |
| 2010/0031254 A1 | 2/2010 | Chin et al. | |
| 2010/0077394 A1* | 3/2010 | Wang et al. | 718/1 |
| 2011/0078361 A1* | 3/2011 | Chen et al. | 711/6 |

OTHER PUBLICATIONS

"The Definitive Guide To The Xen Hypervisor", , Nov. 2007.
Men and the Art of Virtualization, Paul Barham, Boris Dragovic, Keir Fraser, Steven Hand, Tim Harris, Alex Ho, Rolf Neugebauer, Ian Pratt, Andrew Warfield, Oct. 19-22, 2003, Bolton Landing, New York, USA.
"Understanding The Linux Kernel", Nov. 2000.

* cited by examiner

| Execution Time (second) | | | |
|---|---|---|---|
| | VCPU=2 | VCPU=4 | VCPU=8 |
| Multicall | 131.89 | 131.49 | 132.08 |
| DLH | 50.09 | 25.05 | 12.53 |

FIG. 9

| | Execution Time (second) |
|---|---|
| Multicall | 164.16 |
| DLH | 131.07 |

FIG. 10

APPARATUS AND METHOD FOR MANAGING HYPERCALLS IN A HYPERVISOR AND THE HYPERVISOR THEREOF

CROSS-REFERENCE TO RELATED APPLICATION

The present application is based on, and claims priority from, U.S. Provisional Application No. 61/486,255, filed May 14, 2011, the disclosure of which is hereby incorporated by reference herein in its entirety.

TECHNICAL FIELD

The disclosure generally relates to an apparatus and method for managing hypercalls in a hypervisor and the hypervisor thereof.

BACKGROUND

In a traditional operating system (OS) such as Linux, user-level programs request for system services by making system calls. Similarly, in a hypervisor known as virtual machine manager or monitor (VMM) such as Xen, a guest operating system uses hypercalls to request services from a hypervisor. To simplify the design of a hypervisor, Xen put all its device drivers and designated important system daemons into a special privileged domain, called domain 0. Because there is no thread support in the Xen hypervisor space, domain 0 is the only choice for the system daemon to run.

It is different from the traditional Linux, which may run system daemons as kernel threads, for example, network file system (NFS) daemon handles network packets and file system structures inside a Linux kernel. There are two of significant features for both developers and the system performance. One is that the kernel thread may easily access kernel data structures. The other is that the kernel thread has its own process address space, and may be scheduled or context switched as normal process. Unlike the Linux kernel thread, domain 0 may not easily access or modify data structures in hypervisor, but need to request services from the hypervisor to do the job. For domain 0 or operating system in a virtual machine (VM), referred to as guest OS, to request services from a Xen hypervisor, a hypercall application program interface (API) in Xen provides the similar functionality as the system call in the typical OS kernel. Certain services include retrieving important hypervisor data structures, allocating resources for non-privileged VMs, performing I/O requests, and etc. Nevertheless, this interface does not scale well when the system daemon requests a large number of services, i.e., numerous hypercalls. Because each hypercall has extra overhead from the switch between guest OS and hypervisor, the daemon or system performance may suffer if the daemon issues the hypercall one by one.

Nowadays, a guest operating system may choose to either issue the hypercalls one by one, or send them as a batch and block until all of them are completed. A system daemon that wants to request a service from a hypervisor has to use a hypercall API provided by a hypervisor. The multicall API is designed to enable a guest OS to submit a sequence of hypercalls in one shot, thus reducing the number of context switches between the guest OS and the hypervisor. This multicall API could reduce the overall hypercall overhead. However, each multicall is synchronous, which means that the caller and the related virtual central processing unit (VCPU), referred to as $VCPU_h$, will block until all hypercalls inside the multicall are finished. As shown in FIG. 1, large amount of hypercalls in a virtual machine VM-X will block other VM such as VM-Y from running, because the hypervisor did not switch context of hypercalls, for example $H_2$-$H_8$, issued by VM-X during a certain time slice. In addition, the interface is designed to run all calls serially, and a multicall may only utilize the physical CPU (PCPU) resource on which the $VCPU_h$ is scheduled, even when the guest domain is assigned multiple VCPUs that could run on multiple PCPUs.

Some schemes may issue a deferrable function call to defer the work consisting of hypercall routines. Deferring the work may be implemented by several ways such as adopted in Linux interrupt handler and device driver, asynchronous, executed when Xen is idle, etc.

Some reference publications may address issues or provide methods to improve system performance in a virtual machine environment. For example, one reference publication disclosed a method for attenuating spin waiting of virtual processors in a virtual machine environment so that the virtual processors may obtain extra time slice extensions when accessing a synchronization section. This method addresses a scheduling issue in a virtualization environment. Another reference publication disclosed a message receiving method for a message passing interface (MPI) in a virtual machine over-allocation environment. The message receiving method is independent of virtual machine layer dispatching mechanism. By modifying the message receiving mechanism of MPI bank, the method may improve the system performance by coordinating the two dispatching mechanisms in the virtual environment, i.e., client operating system dispatching process to virtual processor, and virtual machine dispatching manager dispatching virtual processor to physical processor.

SUMMARY

The exemplary embodiments of the present disclosure may provide a system and method for managing hypercalls in a hypervisor and the hypervisor thereof.

A disclosed embodiment relates to an apparatus for managing hypercalls in a hypervisor. The apparatus is adapted to the hypervisor having an interrupt handler and a scheduler. The apparatus may comprise a deferrable low-overhead hypercall (DLH) module configured to assign a separate DLH queue to each of a plurality of virtual machines when the virtual machine is initialized, where each entry in the separate DLH queue represents a hypercall routine. When one of the virtual machines notifies the interrupt handler of one or more deferrable hypercalls to be executed, the scheduler selects at least a VCPU and assigns the at least a VCPU to the virtual machine to run on at least a PCPU. The DLH module executes the one or more deferrable hypercalls inserted in a corresponding DLH queue assigned to the virtual machine having the at least an assigned VCPU before the hypervisor restores the VCPU context to the virtual machine having the at least an assigned VCPU.

Another disclosed embodiment relates to a method for managing hypercalls in a hypervisor. The method is implemented in a computer system, and may comprise the following computer executable acts: for each of a plurality of virtual machines, assigning a separate DLH queue when the virtual machine is initialized, where each entry in the separate DLH queue represents a hypercall routine; when one of the plurality of virtual machines notifying the hypervisor of one or more deferrable hypercalls to be executed, selecting at least a VCPU and assigning the at least a VCPU to the virtual machine to run the one or more deferrable hypercalls on at least a PCPU; and executing the one or more deferrable hypercalls in a corresponding DLH queue assigned to the virtual machine having the at least an assigned VCPU before restoring the VCPU context to the virtual machine having the at least an assigned VCPU.

Yet another disclosed embodiment relates to a hypervisor for managing hypercalls in a virtual environment. The hypervisor may comprise an interrupt handler, a scheduler, and a DLH module configured to assign a separate DLH queue to each of a plurality of virtual machines when the virtual machine is initialized, where the separate DLH queue is maintained in the hypervisor and each entry in the separate DLH queue represents a hypercall routine. When one of the plurality of virtual machines notifies the interrupt handler of one or more deferrable hypercalls to be executed, the scheduler selects at least a VCPU and assigns the at least a VCPU to the virtual machine to run on at least a PCPU. The DLH module executes the one or more deferrable hypercalls inserted in a corresponding DLH queue assigned to the virtual machine having the at least an assigned the VCPU before the hypervisor restores the VCPU context to the virtual machine having the at least an assigned the VCPU.

The foregoing and other features, aspects and advantages of the exemplary embodiments will become better understood from a careful reading of a detailed description provided herein below with appropriate reference to the accompanying drawings.

BRIEF DESCRIPTION OF THE DRAWINGS

FIG. 9 shows exemplary experimental results of 50,000 hypercalls' execution time by using multicall scheme and the disclosed DLH mechanism for guest domains that are assigned two VCPUs, four VCPUs, and eight VCPUs, respectively, according to an exemplary embodiment.

FIG. 10 shows exemplary experimental results of 50,000 hypercalls' execution time for guest domains by using a multi-core system without any assigned VCPU, multicall scheme and the disclosed .DLH mechanism for guest domains, respectively, in which a Linux kernel is built with 8 cores, according to an exemplary embodiment.

DETAILED DESCRIPTION OF DISCLOSED EMBODIMENTS

Figure 1:
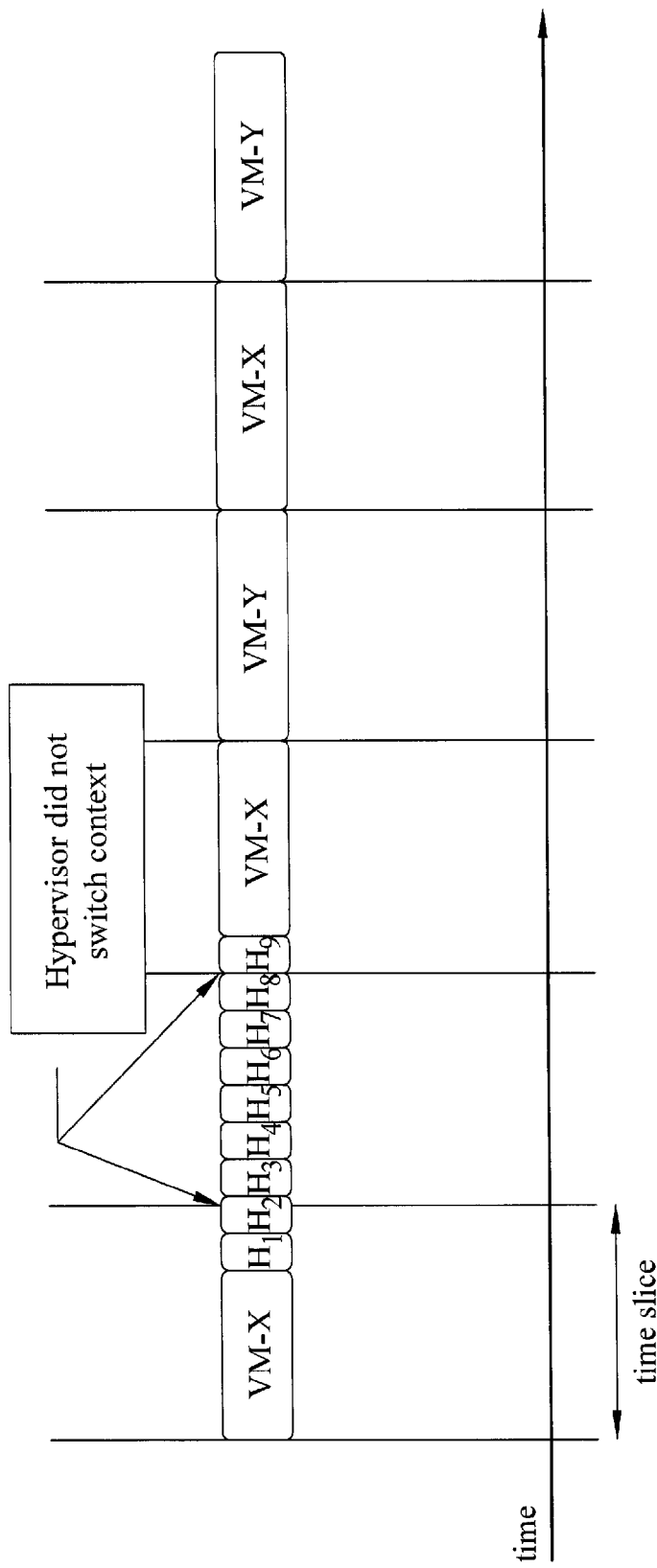
FIG. 1 is an exemplary diagram illustrating a large amount of hypercalls in a virtual machine block other VM from running.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Exemplary embodiments in the disclosure may provide a deferrable low-overhead hypercall (DLH) mechanism to execute hypercalls in an asynchronous manner. A DLH queue is introduced for each guest domain where each entry in the queue represents a hypercall routine. When the hypervisor selects a virtual CPU (VCPU) assigned to a guest domain to run on a physical CPU (PCPU), it first executes entries in the guest domain's DLH queue. The number of entries processed at every visit to the DLH queue is limited to avoid starvation, and may be explicitly specified by the system designer.

Figure 2:
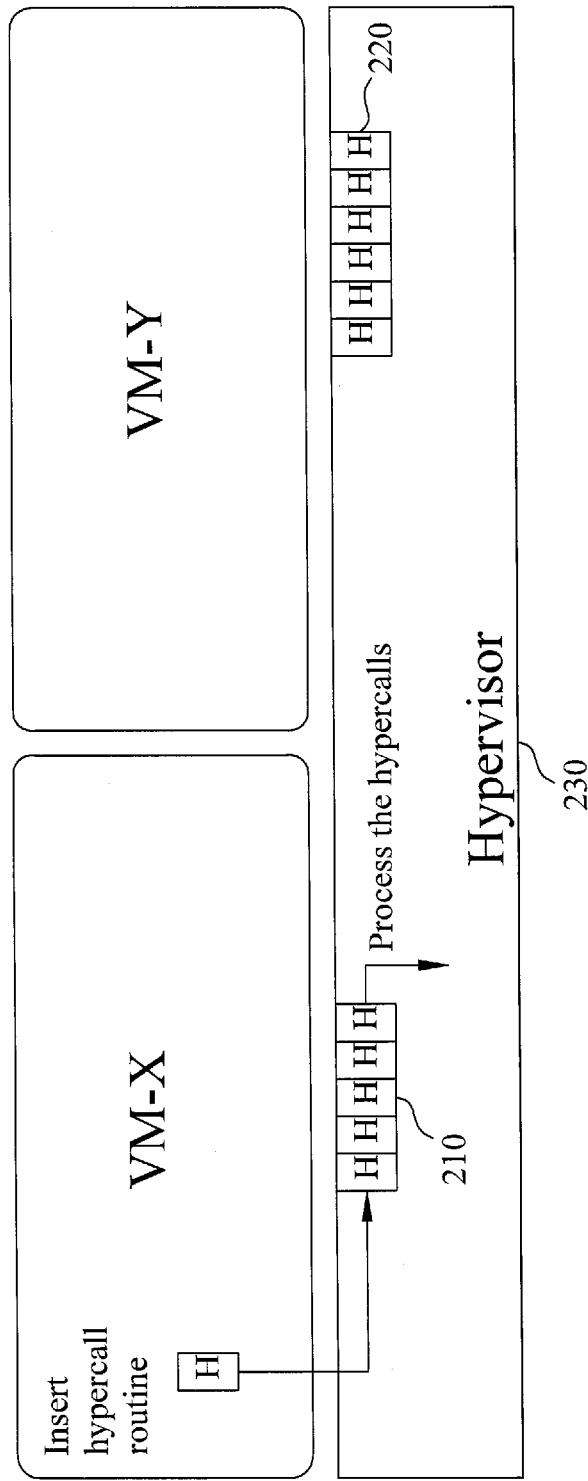
FIG. 2 shows an exemplary schematic view illustrating a DLH mechanism in which each VM may insert hypercall requests to its own DLH queue maintained by a hypervisor, according to an exemplary embodiment.

FIG. 2 shows an exemplary schematic view illustrating a DLH mechanism in which each VM may insert hypercall requests to its own DLH queue maintained by a hypervisor, consistent with certain disclosed embodiments. Referring to FIG. 2, a virtual machine VM-X may insert hypercall requests, such as via hypercall routines, to a DLH queue 210, and a virtual machine VM-Y may insert hypercall requests, such as via hypercall routines, to another DLH queue 220. Both DLH queue 210 and DLH queue 220 may be maintained by a hypervisor 230, where H denotes a hypercall routine.

In the exemplary DLH mechanism, a separate DLH queue is assigned to each guest domain. Each entry of a DLH queue may contain a function pointer to a hypercall routine that a guest domain wants the hypervisor to run on its behalf. Each VM will be assigned a DLH queue when the VM is initialized, and the DHL queue is used for buffering one or more deferrable hypercalls. When the VM is running, it may insert the one or more deferrable hypercalls via a normal hypercall. A guest domain makes a DLH call to insert entries into its DLH queue and the call returns as soon as the insertion is done.

Figure 3:
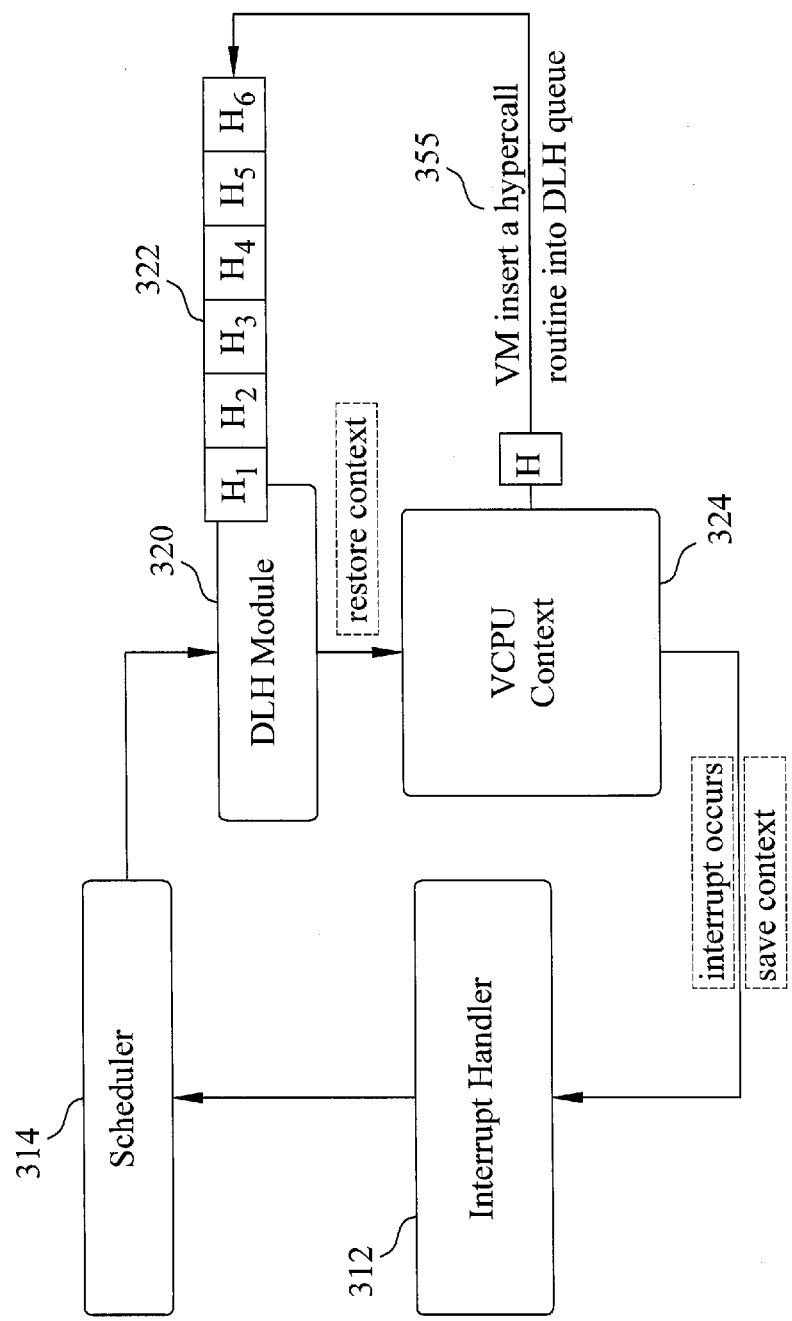
FIG. 3 shows an exemplary schematic view illustrating an apparatus for managing hypercalls in a hypervisor, according to an exemplary embodiment.

FIG. 3 shows an exemplary schematic view illustrating an apparatus for managing hypercalls in a hypervisor, according to an exemplary embodiment. The apparatus may be adapted to a hypervisor (not shown) having an interrupt handler 312 and a scheduler 314, as shown in FIG. 3. Referring to FIG. 3, the apparatus may comprise a DLH module 320 configured to assign a separate DLH queue to each of a plurality of virtual machines when the virtual machine is initialized, where each entry in the separate DLH queue represents a hypercall routine. As a virtual machine is running, it may insert one or more hypercall routines into its DLH queue, as shown by a reference 355 where H denotes a. hypercall routine to be inserted into a DLH queue. When one of the plurality of virtual machines notifies the interrupt handler 312 of at least a deferrable hypercall to be executed, for example, by generating an interrupt in which an interrupt occurs and the VCPU context 324 running on the virtual machine is saved in the hypervisor, the scheduler 314 then selects at least a VCPU and assigns the at least a VCPU to the virtual machine to run on at least a PCPU. The DLH module 320 executes the one or more deferrable hypercalls such as $H_1$-$H_6$, inserted in a corresponding DLH queue 322 assigned to the virtual machine having the at least an assigned VCPU, then the hypervisor restores the VCPU context to the virtual machine having the at least an assigned VCPU.

DLH module 320 and the hypervisor may be designed by one or more hardware circuits with hardware description languages such as Verilog or VHDL. After integration and layout, the hardware circuits may be burned and recorded on a field programmable gate array (FPGA). The circuit design achieved by hardware description languages may be implemented with one or more integrated circuits such as application-specific integrated circuit (ASIC). In other words, DLH module 320 and hypervisor may be implemented with one or more integrated circuits. In another instance, the apparatus may comprise one or more processors to execute each function of DLH module.

Figure 4:
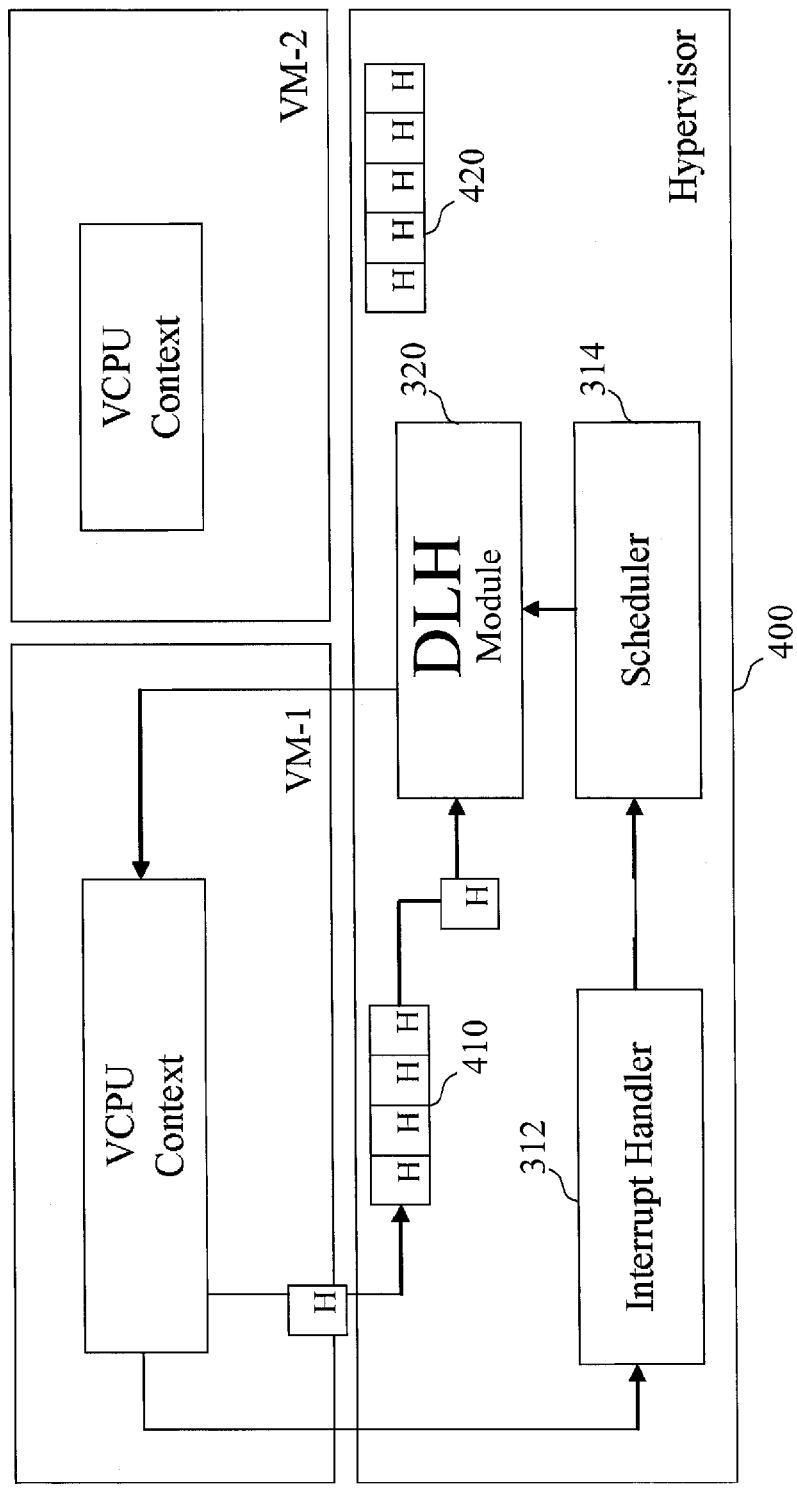
FIG. 4 shows an exemplary schematic view illustrating a hypervisor for managing hypercalls, according to an exemplary embodiment.

Thereby, according to an exemplary embodiment, the hypervisor 400 for managing hypercalls in a virtual environment may comprise the interrupt handler 312, the scheduler 314, and the DLH module 320, which is shown as FIG. 4. In a virtual environment, above the hypervisor 400 may be a plurality of virtual machines. Here, two virtual machines, but is not limited to, are illustrated as shown in FIG. 4 for describing the hypervisor 400. Within each of the two virtual machines VM-1 and VM-2 are the VCPU context for the virtual machine. As mentioned before, the DLH queues assigned to the plurality of virtual machines are maintained in the hypervisor. In FIG. 4, an exemplary DLH queue 410 and an exemplary DLH queue 420 maintained in hypervisor 400 are used for buffering the deferrable hypercalls inserted by the two virtual machines, VM-1 and VM-2, respectively.

In addition, when a virtual machine such as VM-1 is running, it may insert one or more deferrable hypercalls to its own DLH queue via a normal hypercall. When an interrupt occurs, the interrupt handler 312 of hypervisor 400 will save the VCPU context of the virtual machine VM-1. After the interrupt has been handled by the interrupt handler 312, the scheduler 314 will choose at least a VCPU to run. Before restoring VCPU context, the DLH module 320 will check if there is any deferrable hypercalls in the DLH queue of the VCPU's owner VM. When the condition is true, the DLH module 320 picks up the deferrable hypercalls to execute. After the execution of the one or more deferrable hypercalls is done, the hypervisor restores the VCPU context to the virtual machine. The VCPU context is information contents running on the at least a VCPU, such as the program, data, stack contents, or register contents, etc.

As mentioned above, the hypervisor may be implemented with one or more integrated circuits. In other words, the interrupt handler 312, the scheduler 314, the DLH module 320, and one or more DLH queues may be implemented with one or more hardware components such as integrated circuits. Similarly, in another instance, the hypervisor 400 may comprise one or more processors to execute the functions of the interrupt handler 312, the scheduler 314, the DLH module 320, and one or more DLH queues.

Figure 5:
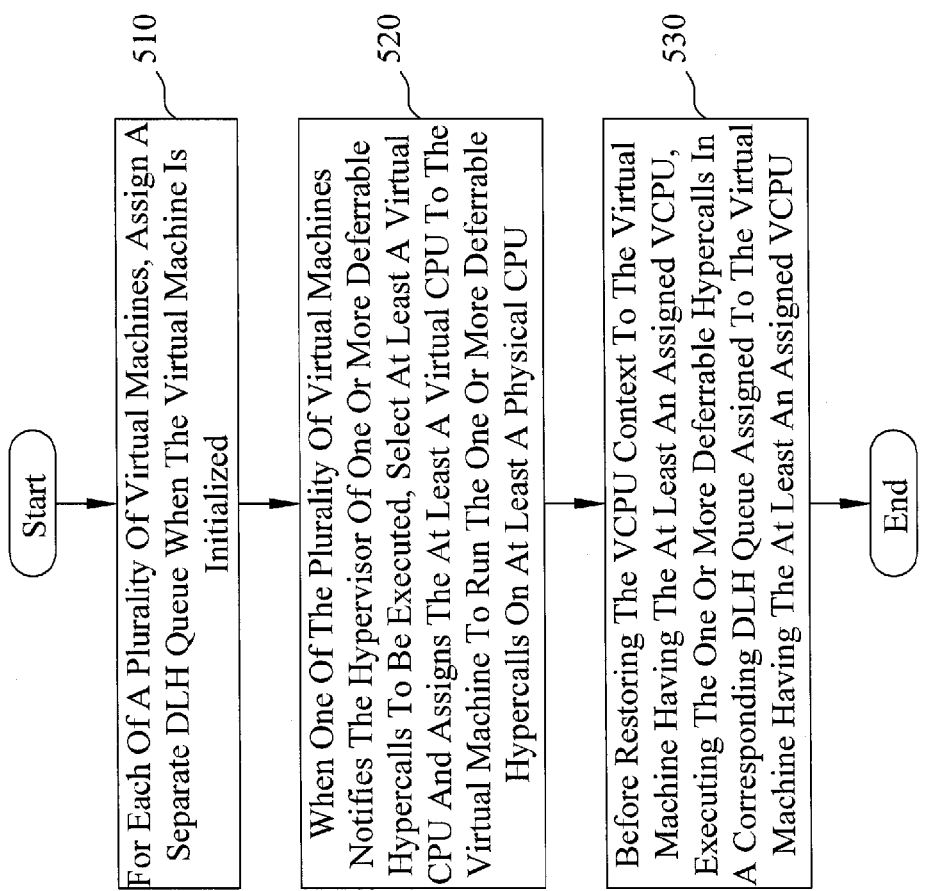
FIG. 5 shows an exemplary flowchart illustrating an operation flow of a method for managing hypercalls in a hypervisor, according to an exemplary embodiment.

With the DLH module 320 and the hypervisor 400, FIG. 5 shows an exemplary flowchart illustrating an operation flow of a method for managing hypercalls in a hypervisor, according to an exemplary embodiment. The method is implemented in a computer system, and comprises the computer executable acts shown in FIG. 5. The method may be adapted to the hypervisor that may comprise one or more processors to process the computer executable acts. Referring to FIG. 5, for each of a plurality of virtual machines, it may assign a separate DLH queue when the virtual machine is initialized (step 510), where each entry in the separate DLH queue represents a hypercall routine. When one of the plurality of virtual machines notifies the hypervisor of one or more deferrable hypercalls to be executed, it may select at least a VCPU and assigns the at least a VCPU to the virtual machine to run the one or more deferrable hypercalls on at least a PCPU (step 520). Then, the one or more deferrable hypercalls in a corresponding DLH queue assigned to the virtual machine having the at least an assigned VCPU are executed, before restoring the VCPU context to the virtual machine having the at least an assigned VCPU (step 530). After having completed the execution of the one or more deferrable hypercalls, the VCPU context is restored to the virtual machine.

Figure 6:
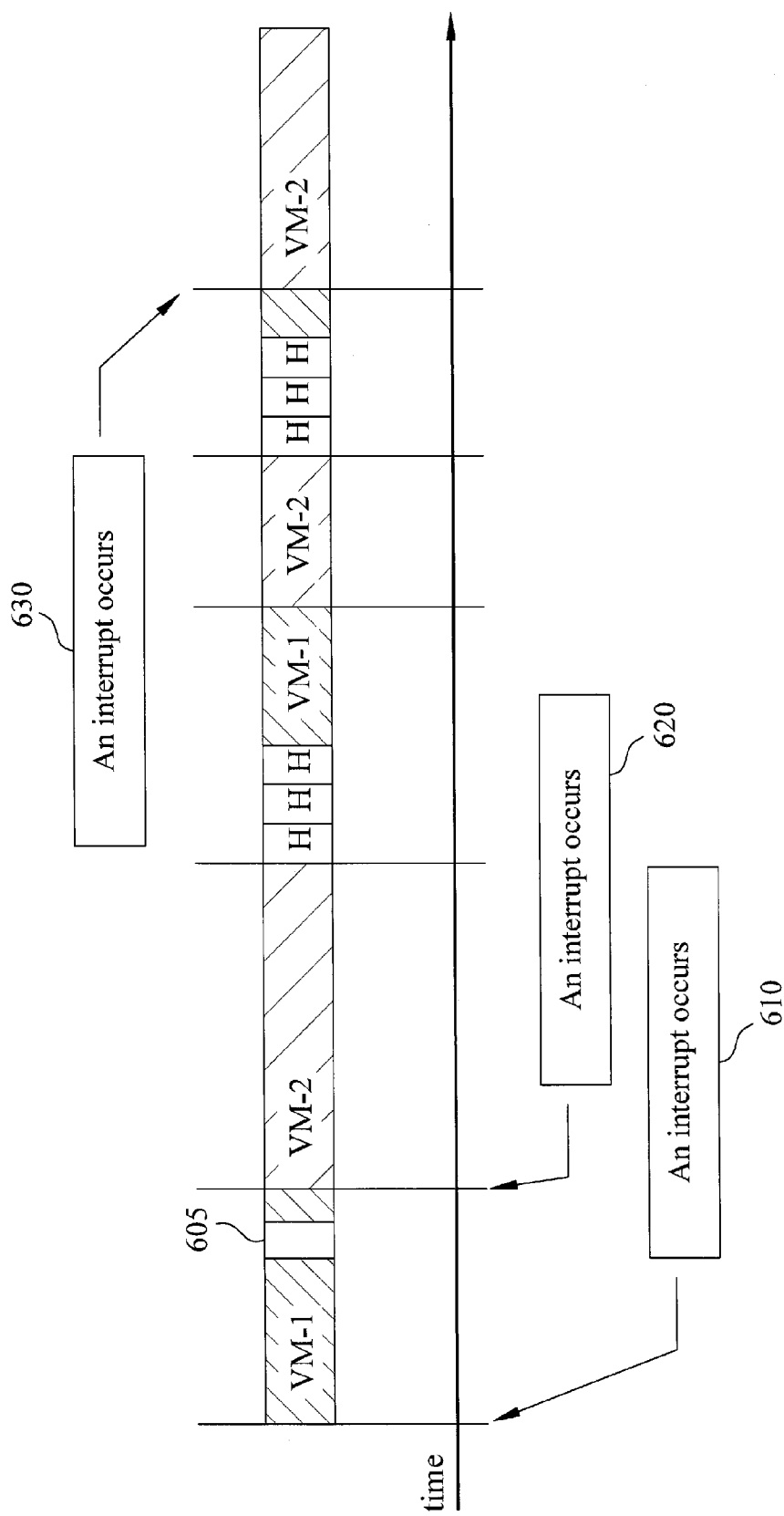
FIG. 6 shows an exemplary schematic view illustrating when the DLH module executes deferrable hypercalls in a single-core system, according to an exemplary embodiment.

Step 510 may be done by the DLH module 320 and the separate DLH queue for each of the plurality of virtual machines may be maintained in the hypervisor for buffering at least a deferrable hypercalls inserted in the separate DLH queue. Step 520 may be done by the scheduler 314 in the hypervisor after an interrupt has been handled by the interrupt handler 312 in the hypervisor. In step 530, the DLH module 320 may execute the one or more deferrable hypercalls in a single-core system or a multi-core system before the hypervisor restores the VCPU context to the virtual machine. The hypervisor may use one or more processors to achieve these functions of DLH module, an interrupt handler and a scheduler FIG. 6 shows an exemplary schematic view illustrating when the DLH module executes deferrable hypercalls in a single-core system, according to an exemplary embodiment. In FIG. 6, assume that a virtual machine VM-1 will use hypercalls to request services from a hypervisor, and it may insert a plurality of deferrable hypercalls to its own DLH queue via a normal hypercall. The DLH module may execute the plurality of deferrable hypercalls in an asynchronous manner, so that the plurality of deferrable hypercalls will not block other virtual machine such as VM-2 from running. In FIG. 6, an interrupt occurs, indicated by reference 610, when virtual machine VM-1 is initiated. When virtual machine VM-1 is running, it inserts a plurality of deferrable hypercalls such as H1~H6 to its own DLH queue by issuing a normal hypercall 605 to the hypervisor. Another interrupt occurs, indicated by reference 620, to notify the hypervisor to pick up a new VCPU context, i.e. the VCPU context of VM-2, based on the hypervisor's current scheduling policy.

After the two interrupts have been handled and completed, the DLH module will check the DLH queue assigned to the virtual machine VM-1 before transferring control to the virtual machine VM-1. Therefore, the plurality of deferrable hypercalls are picked out and executed by the DLH module. When the execution is done, it may transfer control to the virtual machine VM-1. Yet another interrupt occurs, indicated by reference 630, to notify the hypervisor to picks up the next VCPU context, i.e. VCPU context of VM-2, based on the hypervisor's current scheduling policy.

Figure 7:
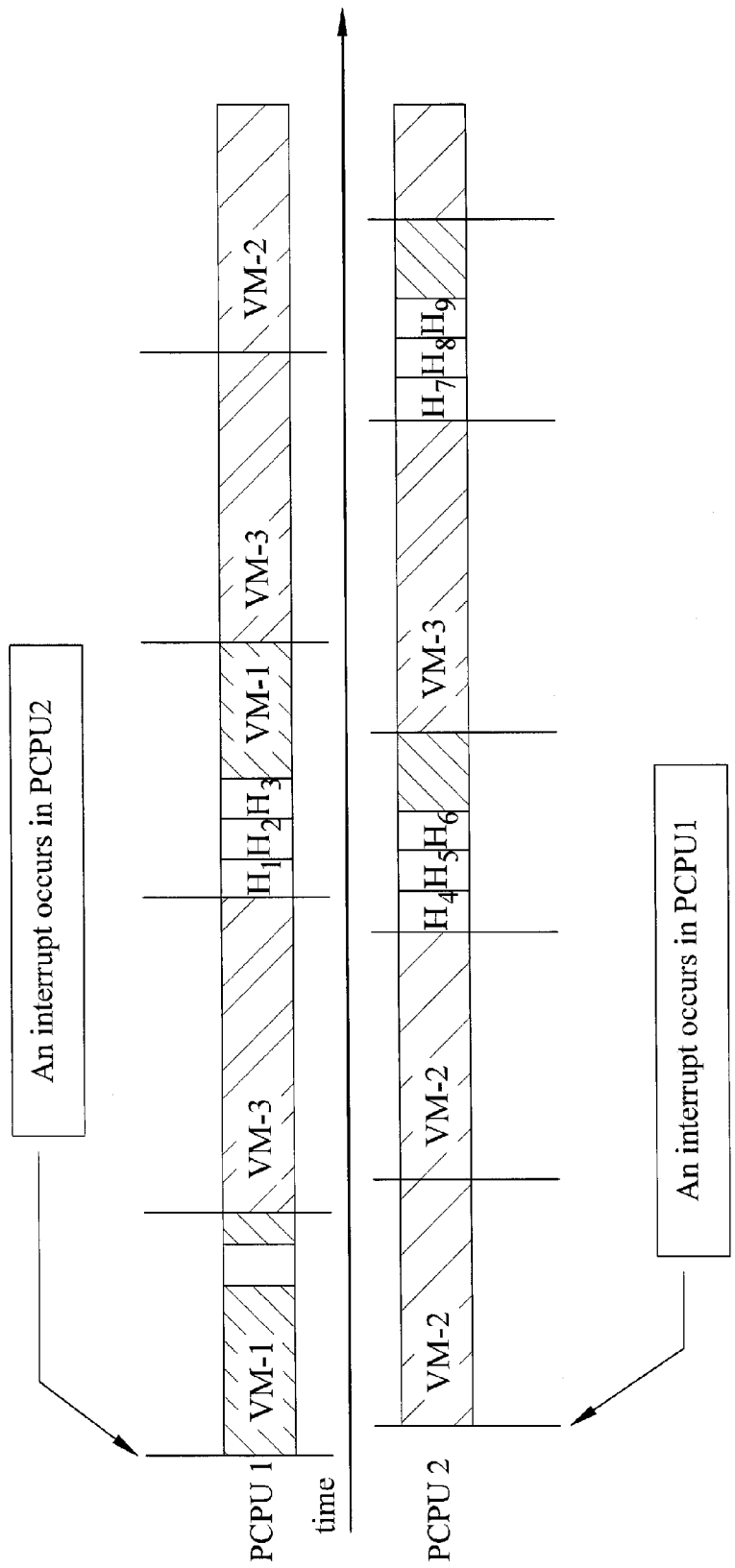
FIG. 7 shows an exemplary schematic view illustrating when the DLH module executes deferrable hypercalls in a multi-core system, according to an exemplary embodiment.

When large amount of deferrable hypercalls are executed in a multi-core system, the DLH module may distribute these deferrable hypercalls on all VCPUs, equalize the impact of this DLH call on all parallel threads, and thus minimize the overall delay introduced by this background DLH call. In other words, the DLH module may scale better for virtual machines that are assigned multiple VCPUs to run on two or more PCPUs. This may be seen from an instance shown in FIG. 7, in which these multiple VCPUs are run on two PCPUs. In FIG. 7, assume that virtual machine VM-1 uses hypercalls to request services from a hypervisor, and the plurality of deferrable hypercalls such as H1~H9 inserted by the virtual machine VM-1 are executed in a multi-core system having two PCPUs, i.e. PCPU1 and PCPU2. The hypercall routines that are put into DLH queue and processed by multiple processors before context switching. As may be seen from FIG. 7, the DLH module may distribute these deferrable hypercalls on all VCPUs to run on the PCPU1 and PCPU2. The DLH module may have a chance to execute these deferrable hypercalls in parallel, thus equalize this DLH call on all parallel threads and reduce the overall delay introduced by this background DLH call.

Therefore, it may be seen from FIG. 6 and FIG. 7, the disclosed DLH module may execute one or more deferrable hypercalls inserted in a DHL queue, where the deferrable hypercalls may be executed in a single-core system or a multi-core system. When the execution of the deferrable hypercalls are done in parallel on a plurality of available PCPUs in a multi-core system, the DLH module may scale better for virtual machines with their deferrable hypercalls being executed in the multi-core system.

When the hypervisor visits a guest domain's DLH queue, it processes entries in the DLH queue before transferring control to the guest domain. In terms of accounting, the resource used by processing these DLH entries is charged to the guest domain inserting them, which is fair because hypercall routine is designed to be used by guest domains rather than just by the hypervisor. For example, suppose a VCPU is given 30 ms of execution time by the scheduler and its hypercall routine costs 5 ms, and then this VCPU should be given only 25 ms for its own execution. In addition, the number of entries processed at every visit to the DLH queue is limited to avoid starvation, and may be explicitly specified.

To receive a notification while the work underlying a DLH call is done, the program issuing a DLH call, for example, may register an event channel with the hypervisor to indicate the intention to receive such a notification.

An exemplary API of a DLH call may comprise at least 4 parameters shown as dlh_call(call_list, nr_calls, callback_fn, nr_entries). The first two parameters are the same as in a multicall, where call_list is an array and each element of which stores the op code of a hypercall and the hypercall's parameters; nr_calls indicates the number of entries in call_list. The third parameter, callback_fn, is a callback function pointer, which is called by the hypervisor after all the hypercalls in the call_list are done. The last parameter, nr_entries, is used to tune the processing granularity of each DLH call. This parameter gives the developer the flexibility of limiting the amount of work done upon each visit to the DLH queue is limited by developer, thus preventing any tasklet-related starvation that may be observed in the current Xen hypervisor.

Figure 8:
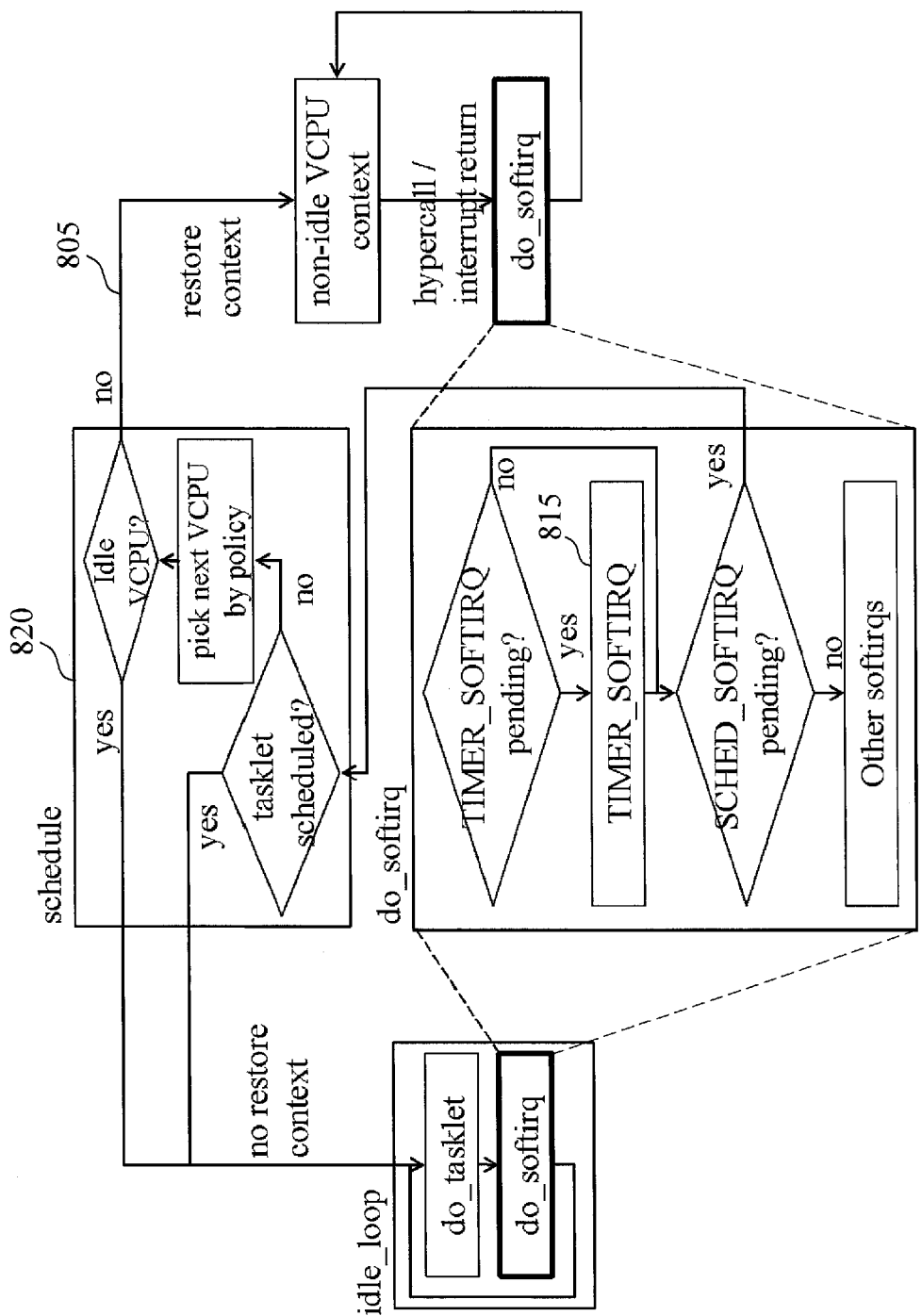
FIG. 8 shows an exemplary scheduling logic of a Xen hypervisor, according to an exemplary embodiment.

Here, a Xen hypervisor is taken as an example to illustrate an exemplary flow chart describing how the Xen hypervisor schedules tasklets, softirqs, and schedule functions, but the application of the disclosed embodiments is not limited to the Xen hypervisor system. FIG. 8 shows an exemplary scheduling logic of the Xen hypervisor, according to an exemplary embodiment. Wherein, each PCPU is initialized with an idle VCPU context that loops inside an idle_loop function. As shown in FIG. 8, the idle_loop function consists of two parts, i.e. do_tasklet and do_softirq. The two do_softirq boxes refer to the same code snippet, whose internal details are shown in a block 810.

The exemplary scheduling logic of the Xen hypervisor in FIG. 8 does the tasks. (1) If SCHED_SOFTIRQ is raised due to a hardware timer interrupt, all registered software timer callback functions are checked to determine if they need to be executed, SCHED_SOFTIRQ is raised, and the hardware timer is re-programmed, e.g., local APIC timer, to setup the next timer firing. (2) In the case when SCHED_SOFTIRQ is raised, do_softirq calls the scheduler 820 to pick up a new VCPU context based on the following rules. First, if the tasklet queue is not empty, the scheduler 820 chooses the idle VCPU context to run on the current PCPU. Otherwise, the scheduler 820 picks up the next VCPU context based on the hypervisor current scheduling policy, e.g., SEDF or Credit. If the idle VCPU is chosen, the PCPU enters idle_loop; otherwise, the context of a non-idle VCPU is restored, and the corresponding domain may continue from where it left off last time.

In FIG. 8, reference 805 indicates processing hypercalls of DLH queue as mentioned earlier. Reference 815 indicates raising SCHED_SOFTIRQ and reprogramming hardware timer interrupt. When hardware timer interrupt comes, TIMER_SOFTIRQ is raised.

One exemplary experiment is conducted to complete 50,000 hypercalls. FIG. 9 shows exemplary experimental results of 50,000 hypercalls' execution time with two assigned VCPUs, four assigned VCPUs, and eight assigned VCPUs, respectively, where the multicall scheme and the disclosed .DLH mechanism are used in a virtual environment. As may be seen from FIG. 9, compared with multicall scheme, the disclosed exemplary DLH mechanism scales much better for guest domains that are assigned multiple VCPUs. And, the more multiple VCPUs are assigned, the more significant efficiency the disclosed exemplary DLH mechanism has.

Another exemplary experiment is conducted to complete 50,000 hypercalls. FIG. 10 shows exemplary experimental results of 50,000 hypercalls' execution time for guest domains by using a multi-core system without any assigned VCPU, multicall scheme and the disclosed .DLH mechanism for guest domains, respectively, in which a Linux kernel is built with 8 cores, according to an exemplary embodiment. As may be seen from FIG. 10, the multi-core system without any assigned VCPU takes the shortest time to complete the 50,000 hypercalls. While compared with the multicall scheme and the disclosed .DLH mechanism, the disclosed .DLH mechanism takes a shorter time to complete the 50,000 hypercalls.

Therefore, the disclosed exemplary embodiments for managing hypercalls in a hypervisor have the features of low-overhead, asynchronous, parallel and tunable. In other words, the calling overhead of the disclosed exemplary DLH mechanism is minimal. The guest OS should not block during the period in which the sequence of hypercalls are being processed. Processing of hypercalls is done in parallel on all available PCPUs in a multi-core system. Users may tune the granularity of the hypercalls being processed. The exemplary embodiments may be applicable to such as those programs that need to request a large number of hypercalls, or memory deduplication that attempts to share duplicate memory among virtual machines such as it requires hypercalls to obtain page content and share.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An apparatus for managing hypercalls in a hypervisor, which is adapted to said hypervisor having an interrupt handler and a scheduler, said apparatus comprising:
    a deferrable low-overhead hypercall (DLH) module configured to assign a separate DLH queue to each of a plurality of virtual machines when said virtual machine is initialized, where each entry in the separate DLH queue represents a hypercall routine;
    wherein when one of said plurality of virtual machines that is running notifies said interrupt handler of one or more deferrable hypercalls to be executed, said interrupt handler saves the virtual central processing unit (VCPU) context of said running virtual machine, and said scheduler selects at least a VCPU and assigns the at least a VCPU to said virtual machine to run on at least a physical CPU (PCPU), and said DLH module executes said at least a deferrable hypercall inserted in a corresponding DLH queue assigned to the virtual machine having the at least an assigned VCPU before said hypervisor restores VCPU context to the virtual machine having the at least an assigned virtual CPU.

2. The apparatus as claimed in claim 1, wherein said VCPU context is information contents running on the at least a VCPU.

3. The apparatus as claimed in claim 1, wherein said DLH module and said hypervisor are implemented with one or more integrated circuits.

4. The apparatus as claimed in claim 1, said apparatus comprises one or more processors to execute one or more functions of said DLH module.

5. The apparatus as claimed in claim 1, wherein all separate DLH queues assigned to said plurality of virtual machines are maintained in said hypervisor.

6. The apparatus as claimed in claim 1, wherein said one or more deferrable hypercalls are executed in a single-core system or a multi-core system.

7. The apparatus as claimed in claim 1, wherein when said virtual machine is running, it inserts said one or more deferrable hypercalls into said separate DLH queue via a normal hypercall.

8. A hypervisor for managing hypercalls in a virtual environment, said hypervisor comprising:
    a deferrable low-overhead hypercall (DLH) module configured to assign a separate DLH queue to each of a plurality of virtual machines when the virtual machine is initialized, where said separate DLH queue is maintained in said hypervisor and each entry in said separate DLH queue represents a hypercall routine;
    an interrupt handler; and
    a scheduler;
    wherein when one of the virtual machines notifies that is running notifies said interrupt handler of one or more deferrable hypercalls to be executed, said interrupt handler saves the virtual central processing unit (VCPU) context of said running virtual machine, and said scheduler selects at least a VCPU and assigns the at least a VCPU to said virtual machine to run on at least a physical CPU (PCPU), and
    said DLH module executes the one or more deferrable hypercalls inserted in a corresponding DLH queue assigned to the virtual machine having the at least an assigned VCPU before said hypervisor restores VCPU context to the virtual machine having the at least an assigned VCPU.

9. The hypervisor as claimed in claim 8, wherein said DLH module, said interrupt handler, and said scheduler are implemented with one or more hardware components.

10. The hypervisor as claimed in claim 8, said hypervisor comprises one or more processors to execute one or more functions of said DLH module, said interrupt handler, and said scheduler.

11. The hypervisor as claimed in claim 8, wherein said one or more deferrable hypercalls are executed in a single-core system or a multi-core system.

12. The hypervisor as claimed in claim 11, wherein said one or more deferrable hypercalls are executed in parallel on a plurality of available PCPUs in said multi-core system.

13. The hypervisor as claimed in claim 8, wherein each of a plurality of virtual machines inserts one or more deferrable hypercalls into its DLH queue when the virtual machine is running.

14. The hypervisor as claimed in claim 8, wherein an interrupt occurs to notify said interrupt handler of said one or more deferrable hypercalls to be executed.

15. A method for managing hypercalls in a hypervisor, said hypervisor at least including an interrupt handler and a scheduler, said method being implemented in a computer system, and comprising the following computer executable acts:
    for each of a plurality of virtual machines, assigning a separate deferrable low-overhead hypercall (DLH) queue when the virtual machine is initialized, where each entry in the separate DLH queue represents a hypercall routine;
    when one of the plurality of virtual machines that is running notifies said interrupt handler of one or more deferrable hypercalls to be executed, said interrupt handler saving the virtual central processing unit (VCPU) context of said running virtual machine, and said scheduler selecting at least a VCPU and assigning the at least a VCPU to the virtual machine to run the one or more deferrable hypercalls on at least a physical CPU (PCPU); and
    executing the one or more deferrable hypercalls in a corresponding DLH queue assigned to the virtual machine having the at least an assigned VCPU before restoring the VCPU context to the virtual machine having the at least an assigned VCPU.

16. The method as claimed in claim 15, said method is adapted to said hypervisor having a DLH module, said interrupt handler and said scheduler to process the computer executable acts, and said hypervisor uses one or more processors to achieve one or more functions of DLH module, said interrupt handler and said scheduler.

17. The method as claimed in claim 15, wherein the corresponding DLH queue is used for buffering the one or more deferrable hypercalls to be executed.

18. The method as claimed in claim 16, wherein for each of the plurality of virtual machines, the separate DLH queue is maintained in the hypervisor for buffering at least a deferrable hypercalls inserted by the virtual machine via a normal hypercall, when the virtual machine is running.

19. The method as claimed in claim 16, wherein said DLH module is configured to execute the one or more deferrable hypercalls in an asynchronous manner.

20. The method as claimed in claim 16, wherein when an interrupt occurs, the interrupt handler of said hypervisor saves VCPU context of the virtual machine, where the VCPU context is information contents running on at least a VCPU.

21. The method as claimed in claim 20, wherein said interrupt occurs to notify said hypervisor to pick up a new VCPU context, based on a current scheduling policy of said hypervisor.

22. The method as claimed in claim 20, wherein said interrupt occurs to notify said hypervisor to pick up a new VCPU context, based on a current scheduling policy of said hypervisor.

23. The method as claimed in claim 22, wherein after said interrupt has been processed by the interrupt handler, said scheduler assigns the at least a virtual CPU to the virtual machine to run the one or more deferrable hypercalls on the at least a PCPU.

24. The method as claimed in claim 23, wherein before restoring the VCPU context to the virtual machine, the DLH module checks if there is any deferrable hypercalls in the corresponding DLH queue, and when this is true, the DLH module executes the one or more deferrable hypercalls on the at least a PCPU.

25. The method as claimed in claim 24, wherein after the execution of the one or more deferrable hypercalls is done, the hypervisor restores the VCPU context to the virtual machine.

* * * * *